Nov. 26, 1963   W. C. JOHNSON   3,111,747
HOLLOW ARTICLES
Filed June 30, 1959   6 Sheets-Sheet 1

INVENTOR.
WALLACE COLLISTER JOHNSON
BY
ATTORNEYS

Nov. 26, 1963    W. C. JOHNSON    3,111,747
HOLLOW ARTICLES

Filed June 30, 1959    6 Sheets-Sheet 2

INVENTOR.
WALLACE COLLISTER JOHNSON
BY
ATTORNEYS

Nov. 26, 1963 W. C. JOHNSON 3,111,747
HOLLOW ARTICLES
Filed June 30, 1959 6 Sheets-Sheet 3

INVENTOR.
WALLACE COLLISTER JOHNSON
BY
ATTORNEYS

Nov. 26, 1963  W. C. JOHNSON  3,111,747
HOLLOW ARTICLES

Filed June 30, 1959  6 Sheets-Sheet 4

INVENTOR.
WALLACE COLLISTER JOHNSON
BY
ATTORNEYS

Nov. 26, 1963 W. C. JOHNSON 3,111,747
HOLLOW ARTICLES
Filed June 30, 1959 6 Sheets-Sheet 5

INVENTOR.
WALLACE COLLISTER JOHNSON
BY
ATTORNEYS

United States Patent Office 3,111,747
Patented Nov. 26, 1963

3,111,747
HOLLOW ARTICLES
Wallace Collister Johnson, Hamden, Conn., assignor to Olin Mathieson Chemical Corporation, East Alton, Ill., a corporation of Virginia
Filed June 30, 1959, Ser. No. 823,960
7 Claims. (Cl. 29—157.3)

This invention relates to hollow articles and more particularly to a method of making hollow articles adapted for use as structural panels.

Although in the fabrication of structural panels from sheet metal various methods have heretofore been employed, they have all been subject to various disadvantages. For example, one method involves providing, by cutting and the like, a plurality of individual units or components, with or without forming, assembling them together and then joining them together by welding, riveting, and the like. Another method involves assembling corrugated inner sheets between a bottom and a top sheet and then resistance welding the sheets together by either spot welding or continuous welding at the points of contact at each crest of the corrugation, of the inner sheet.

The above methods require a large amount of hand work and in addition employ excess material in the form of welds and/or rivets which appreciably increase the weight and cost of the completed structure.

Another method of making structural panels involves superimposing a plurality of sheets together, interposing weld-inhibiting material in the form of parallel bands applied at spaced intervals between adjacent sheets followed by welding the adjacent components together in the areas not separated by weld-inhibiting material followed by distention of the welded unit by injecting therein fluid pressures and the like. However, in this method the inner components or sheets during distention of the structure are stretched beyond their yield point and thereby necessarily thinned by elongation which materially decreases the strength of the web portions formed by the inner sheets.

A still further method involves extruding aluminum and like metals into flat one piece structural panels. However, this method is disadvantageously restricted to relatively thick gauges and to panel widths of about 12 inches.

It is an object of this invention to provide a novel method of fabricating structural panels eliminating disadvantages of the prior art.

It is also an object of this invention to provide a novel method of fabricating structural panels for application as wall partitions, exterior walls of buildings, floor beds of trucks and the like.

Another object of this invention is to provide a novel method of fabricating structural panels from metal sheet stock which if desired may be adapted for use as heat exchangers or in other applications where hollow structures are desired.

Another object of this invention is to provide a novel method for obtaining structural panels adapted to be fabricated by conventional pressure-welding techniques.

It is a further object of this invention to provide a novel method of making structural panels of unitary construction and maximum strength free from any discontinuities throughout material employed in the structure.

It is a still further object of this invention to provide a novel method of fabricating structural panels from sheet metal without weakening the strength of the various components during ultimate shaping of the panel.

It is still another object of this invention to provide a novel method of fabricating structural panels having greater strength to weight ratios.

Other objects and advantages will be more apparent from the following description and drawings in which.

Figure 1:
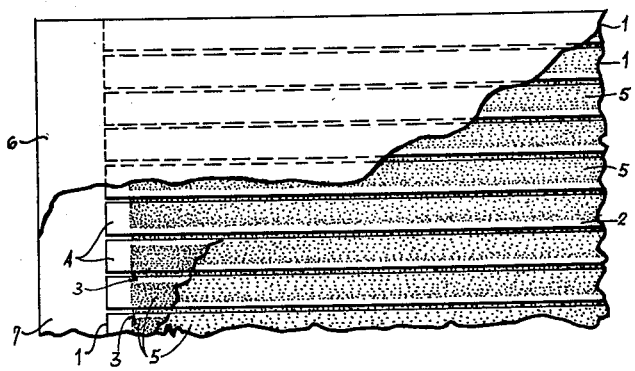
FIGURE 1 is a partial plan view in section illustrating an assembly of components in accordance with one embodiment of this invention.

Referring to the drawings, a plurality of identical insert strips 1 and 1' of 0.100 inch thick ASTM 1100 type aluminum alloy, after a preliminary cleaning and wire brushing of all welding surfaces, are coated with a weld-inhibiting material 5, such as graphite in water glass, on all surfaces so as to provide bands 2 and 3 free of weld-inhibiting material each on opposite faces and adjacent the lateral edges of the strip. For purposes of a preferred subsequent step of expansion, the ends of strip 1 are provided with sections 4 in which all surfaces at both ends of strip 1 are, as bands 2 and 3, also free of weld-inhibiting material.

Subsequent to the application of weld-inhibiting material on a pair of strips 1 and 1', a plurality of such pairs of strips are then superimposed upon each other so that the area on one face of a strip coated with weld-inhibiting material and the band free of weld-inhibiting material are in mating relationship with the coating surface and the uncoated band on the adjacent surface of the other strip to which the first strip is paired. The interior faces of the pair of strips thus sandwich between them a resultant band 8 coated with weld-inhibiting material and a resultant band 9 free of weld inhibiting material. In the embodiment shown, the outer faces of the pairs of strips 1 have their bands 2 free of weld-inhibiting material adjacent the same lateral side of the strips. A plurality of the pairs of strips 1 are then interposed in spaced and parallel relationship between sheets 6 and 7 of ASTM 1100 type aluminum alloy longer than the strips 1 and 1' so as to project at 110 beyond both ends of the strips. Although the pairs of strips are shown in spaced relationship, it is to be understood that since the sides of the strips are coated with weld-inhibiting material, the spacing includes an arrangement wherein the edges of the strips are in contacting and continuous relation with each other. The spacing of the strips and sheets is depicted in exaggerated form to denote more clearly the application of weld-inhibiting material between adjacent surfaces. Generally the thickness of the weld-inhibiting material employed will be of the order of 0.001 of an inch, which will be the distance of the spacing between adjacent surfaces.

Although in this embodiment all metal strips 1 have been of equal width, it is to be understood that where a structural panel of angular dimension is desired, the pairs of strips employed between outer sheets 6 and 7 may be progressively decreasing width.

Figure 3:
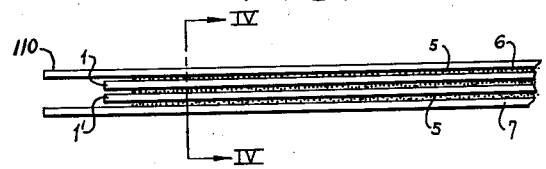
FIGURE 3 is a partial side view of the embodiment of FIGURE 1.
Figure 4:
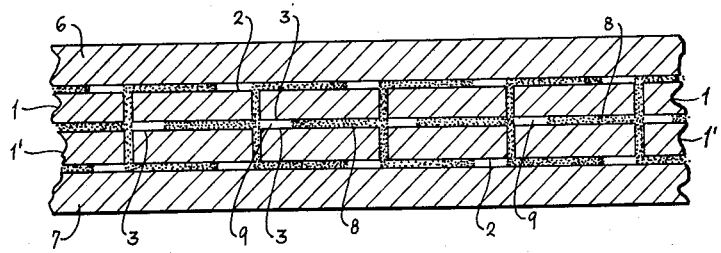
FIGURE 4 is a partial sectional view taken along line IV—IV of FIGURE 3.

The assembly depicted in FIGURES 1, 3 and 4 form a stack 0.400 inch thick which is appropriately secured together in some appropriate manner as by spot welding or seam welding across the area adjacent sections 4 of strips 1, so as to prevent relative movement of the components in preparation for a subsequent pressure-welding operation.

Although a specific aluminum alloy was described in the foregoing example, it is to be understood that a variety of metals may be employed depending not only upon economic considerations but particularly upon a specific application to which the panel is put. Thus, the final structural panel of this invention can be made from other aluminum alloys, copper alloys, titanium, zirconium, steel or similar alloys. Similarly, any weld-inhibiting material capable of preventing welding of juxtaposed surfaces may be substituted for the specific weld-inhibiting material described above. Also the metal sheets and metal strips employed may be of any combination of metals for any desired application. For example, if the panel is to be employed for the outer walls of buildings, it is generally preferred that the panel be not only light weight, but in addition, resistant to the elements. For this application, it is readily seen that aluminum is not only suitable, but preferred since it is both relatively light in weight and resistant to oxidation. However, if the structural panel is intended for application which requires it to withstand any type of a more severe loading force, it is readily seen that the panel may be of either heavier gauge or of other metal or a combination of the two. Thus, if the panel is intended for heavier applications, such as floor beds in trucks, the panel may be formed of steel and the like. In addition, where the panel is intended for application in forming bodies of trucks, it will be understood that the structural panel for the floor beds may be formed of steel, whereas the structural panel for the side walls may be formed of aluminum alloys which side walls may be adapted to contain a heat exchange fluid for temperature control if refrigeration is desired.

Similar variables also apply with respect to the specific gauges of the metals employed since the thickness of the metal will vary according to the application intended for the final fabricated unit. Accordingly, the gauges of the components may be selected to give a uniform cross-sectional thickness in all of the components, or any desired variation in thickness between the outer walls and the interconnecting webs or legs between the outer walls. In like manner, the components may be selected from various combinations of metals to provide specific physical properties in the outer surfaces distinguishable from the physical properties in the legs or interconnecting members between them.

Similarly, the panels may be fabricated in any suitable standard lengths for forming either partition walls or exterior walls of buildings. As will be obvious, the panel may be fabricated to suitable dimensions so that it may be employed as a complete unitary structure for any desired application, such as flooring for trucks, airplanes and the like. Or, where a plurality of panels of standard length or width are used, the individual panels may be provided with various types of interconnecting means well known in the art. For example, the panels may be butt-welded to each other or the panels may be provided with projecting flanges so that they may be connected to each other by screw fastening means, spot welding or with explosive rivets or bolts. When utilized in the erection of walls and buildings, these panels may in like manner be secured to the girder frame work of the buildings.

Subsequent to securing the various components together against relative movement between them, the pack is then ready for pressure-welding together of the strips or components in accordance with conventional practices. Typical conditions with which the panel of this invention is welded are set forth in the well known process of fabricating hollow panels, as refrigerator heat exchangers and the like, disclosed in the patent to Grenell, U.S. No. 2,690,002, granted on September 28, 1954.

In accordance with the conventional practices, the secured assembly of strips and components was heated in a suitable furnace to pressure welding temperatures about 900° F. and immediately rolled between a pair of mill rolls to effect a reduction of about 65% to a thickness of 0.14 inch wherein all of the adjacent areas not separated by weld-inhibiting material are pressure-welded to each other resulting in substantially complete erasure of the interfaces between the sheets and strips of metal by interdispersion of the grains between adjacent surfaces. The resultant juncture is usually characterized by tensile strength equal to that of other seamless regions of the structure. As will be understood, the amount of reduction required to effect pressure-welding will vary with the particular combination of metals and the physical properties thereof. Generally, a reduction of the order of 35% will accomplish pressure-welding of adjacent surfaces not separated by weld-inhibiting material, however, it will be understood that lower or higher percent reductions may be sufficient or required with different metals and/or different temperatures.

Figure 5:
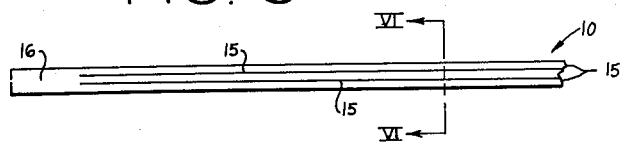
FIGURE 5 is a side view of a blank welded from the embodiment illustrated in FIGURES 1 to 4.
Figure 6:
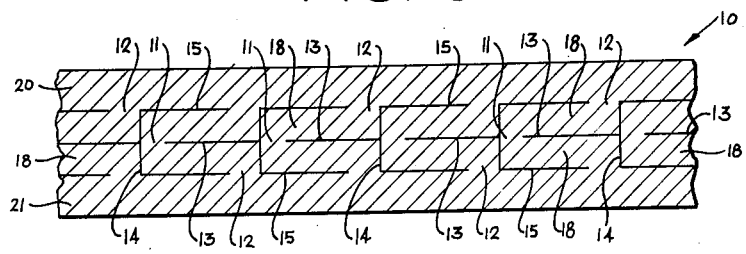
FIGURE 6 is a partial sectional view taken along line VI—VI of FIGURE 5.

By reference to the resultant structure 10 of FIGURES 5 and 6, it can be seen that portions of each insert are pressure-welded to each other at 11 and to the outer sheets at 12, whereas adjacent surfaces separated by weld-inhibiting material result in laminations 13 between faces of the strips, laminations 14 between the sides of the strips, and laminations 15 between a face of the strip and the adjacent metal surfaces 6 and 7. Thus, the pressure-welding of a pair of strips 1 and 1' to each other only along one pair of complementary lateral edges at point 11, and to the outer sheets 6 and 7 only at the other lateral edges at points 12 forms a plait or a plaited section or portion 18 of an embryonic or undeveloped interconnecting reinforcing member or rib 19, with and between integral outer sheets 20 and 21. Thus, as can be seen, the particular pattern of weld-inhibiting material and parameter of strips and sheets provides upon pressure-welding a continuous unwelded portion of metal folded over upon itself to form plaited sections 18. During a subsequent expansion these plaited sections unfold to form the interconnecting cross members or reinforcing ribs 19 between the walls of the structural panel. In the specific embodiment described above, the resultant structure is also provided with a portion 16 completely welded throughout its cross-section, due to the provision of the uncoated sections 4 in strips 1 and 1'.

Although the portions 110 of sheets 6 and 7 projecting beyond the strips 1 are not reduced to as great an extent as the portions of the assembled unit intermediate the ends of strips 1, the pressure-welded portion 16 of pressure-welded unit 10 is sufficiently pressure-welded to withstand the low pressures required for expansion of the structural panel of this invention, since no substantial elongation of any component member is necessary. This specific embodiment is described since it is desired to utilize a low pressure for expansion of the pressure-welded unit into a resultant structural panel. If higher pressures are desired for expanding the panel, projecting portions 110 may have placed between them space filling inserts for welding thereto. In such a modification all portions of the resultant assembly will be reduced, during pressure-welding to the same extent providing pressure welds of equal strength. However, where utilization of a fluid is not desired, the resultant pressure-welded structure 10 may have the pressure-welded portion 16 appropriately cut off or the assembly in FIGURE 1 may be formed of sheets and strips of equal length to provide laminations extending to and at the ends of the resultant welded structure. Such an arrangement is particularly adaptable for expansion, in any circumstance which may warrant it, by means of driving a mandrel through each lamination, in the pressure-welded unit. Alternately, any suitable means may be employed to the surfaces of the panel to separate the outer sheets and unfold the plaited portions, reinforcing ribs 18.

As may be seen with the described embodiment, the laminations are completely contained within the pressure-welded unit which as shown will require a subsequent distention of each and every lamination in each section formed by pairs of strips 1 and the adjacent surfaces of sheets 6 and 7. However, although not shown with respect to the specific embodiment described, strips 1 are preferably provided with orifices, such as 17 in the embodiment illustrated in FIGURE 19, to form a means of fluid intercommunication between all sections ultimately formed from and between the pairs of strips 1 and 1' and the adjacent surfaces of sheets 6 and 7. Where such an orifice is provided, it will be understood that the walls of the orifices may be coated with weld-inhibiting material or the orifice filled with a weld-inhibiting material. The pressure-welded unit 10 is ready for expansion, or if desired, the unit may be softened in any appropriate manner as by annealing and thereafter cold rolled to provide either a more even thickness or to final gauge and again annealed which, for the alloy of this embodiment is at a temperature of about 650° to 700° F.

After treatment to obtain the specific conditions desired in the pressure-welded unit 10, a suitable opening is made into the unit 10 into any of the laminations 15 by insertion of a suitable nozzle followed by injection of suitable fluid pressure to expand the unit into structural panels of this invention. Where the strips 1 of this invention are provided with interconnecting orifices 17, a suitable method of expanding unit 10 is such as disclosed in a patent to Heidorn, U.S. No. 2,756,487, granted on July 31, 1956. This method involves counterboring through one side of unit 10 at a point and to the depth of one of the laminations 15 attaching a nozzle to the bore provided, followed by injection of a fluid pressure to expand the panel.

Another manner of providing a means for injection of a fluid pressure for expanding the pressure-welded assembly may be accomplished by initially providing a tube having its interior surface coated with weld-inhibiting material placed between the projecting portions 110 of sheets 6 and 7 in communicating relationship with the weld-inhibiting material between the components of the assembly. Subsequently and projecting externally of the assembly. Subsequent to pressure-welding of the assembly the tube may be readily opened for injecting a fluid pressure into the assembly. As indicated above, other suitable methods of providing an opening into the assembly may be employed whereafter the unit 10 may be expanded without restraint or between spaced apart rigid platens.

Figure 7:
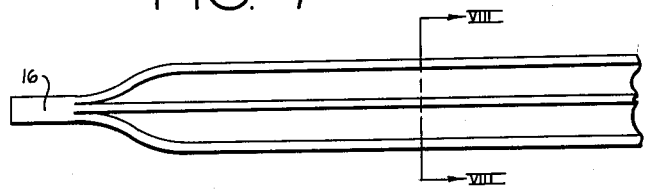
FIGURE 7 is a partial side view of the blank of FIGURE 5 after partial distention thereof.
Figure 8:
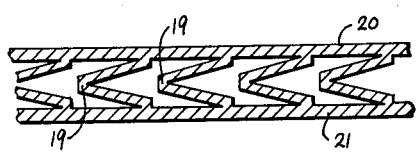
FIGURE 8 is a partial sectional view taken along the line VIII—VIII of FIGURE 7.

Upon injection of fluid pressure into the laminations of pressure-welded unit 10, the outer sheets are separated away from each other with a simultaneous unfolding of the plaited portion 18 to form integral interconnecting members or reinforcing ribs 19 which also serve as spacers between the outer walls 20 and 21 of the structural panel. In this manner, the members or ribs 19 are formed by unfolding of the plaited portions 18 without any substantial drawing, thinning or elongation of these inner ribs or members 19. In this manner, there is no resulting weakening of the ribs or members 19. However, it is to be understood that where a greater thickness is desired in the final fabricated structural unit of this application, this may be accomplished by increasing the level of pressure within the pressure-welded unit 10 of FIGURE 5 with subsequent elongation of ribs or members 19. However, where this is done, it will be understood that this can only be accomplished by a step involving the application of this invention to the point wherein elongation of ribs or members 19 begins to take place. A partially expanded panel is illustrated in FIGURES 7 and 8.

In these FIGURES it can be seen that as the outer sheets are separated, the plaited portions, due to the specific manner in which the strips are pressure-welded to each other and to the sheets, are forced, by unfolding, to bend out of parallel with the plane of the walls 20 and 21, formed from sheets 6 and 7, respectively.

Figure 9:
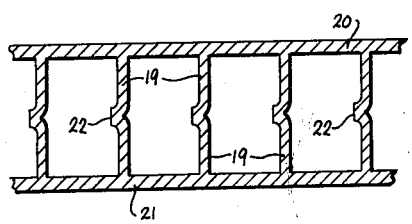
FIGURE 9 is a partial sectional view illustrating the section of FIGURE 8 in a fully expanded form.

Although the specific embodiment illustrated in FIGURE 9 shows flanges 22 projecting from corresponding faces of ribs 19, it can be readily seen that the flanges may be made, if desired, to project in opposed directions from the surfaces of adjacent pairs of ribs 19. This arrangement of flanges 22 provides an additional advantage where the unit is desired to be employed as a heat exchanger, since these flanges can be made to serve as fins for the transmission of heat from and into different heat exchange mediums employed in the tubular cross-sections formed between ribs 19. Upon inflation, it was found that the portions formed by the pressure welding together of strips 1 and sheets 6 and 7 had a thickness of 0.07 inch whereas the unwelded portions of either strips 1 or sheets 6 and 7 had a thickness of 0.035 inch.

Figure 10:
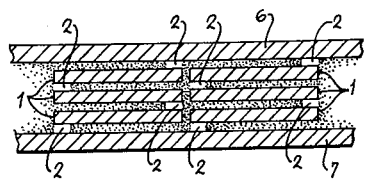
FIGURES 10 to 28 illustrate other various embodiments of this invention in their assembled form and in their corresponding partially or fully inflated forms.
Figure 11:
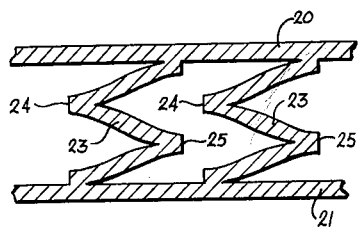

FIGURE 10 illustrates a modification of the preceding embodiment in which three identical inserts 1 are superimposed upon one another with the bands 2, free of weld-inhibiting material, provided at alternate complementary edges between strips 1 and sheets 6 and 7. This particular embodiment results in a structural panel with ribs or interconnecting members 23, between outer walls 20 and 21, having two projecting flanges 24 and 25. The expanding panel is shown in a partially inflated form in FIGURE 11 to illustrate the unfolding of the plaited portions formed as a result of the specific pattern of weld-inhibiting material coated on strips 1 and 1' prior to interpositioning between sheets 6 and 7.

Figure 2:
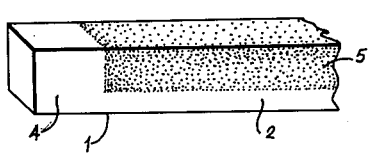
FIGURE 2 is a perspective view illustrating the application of a pattern of weld-inhibiting material to the metal strips employed in the embodiment of FIGURE 1.
Figure 12:
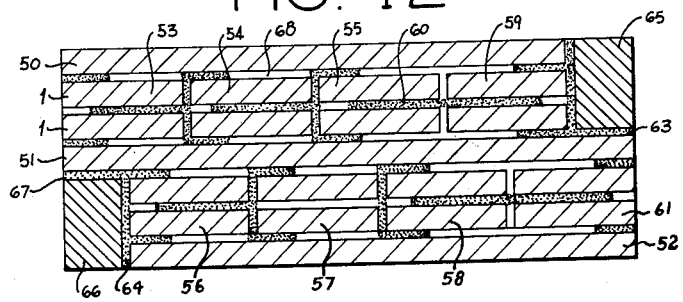
Figure 13:
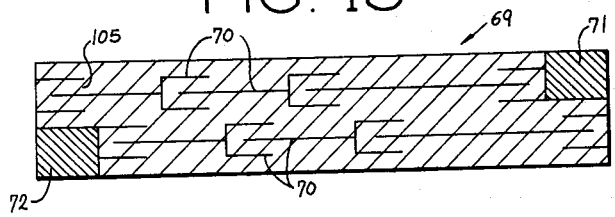

FIGURE 12 illustrates the assembly of metal strips and metal sheets into a more extensive modification of the embodiments discussed above. In this embodiment a plurality of strips 1 and 1' coated with weld-inhibiting material as in FIGURE 2 are inserted between a plurality of superposed sheets of metal 50, 51 and 52. As can be seen sheet 51 is of greater width than either the two outer sheets 50 and 52. These sheets are superposed over each other so that one lateral edge of sheet 50 is adjacent one lateral edge of sheet 51 and a lateral edge of sheet 52 is adjacent the opposite lateral edge of sheet 51 projecting beyond sheet 50. Thus, sheet 51 will also extend beyond the lateral edge of sheet 52. In this embodiment the pairs of strips 53, 54, 55, 56, 57 and 58 are interposed in the same directional relationship between superposed sheets 50, 51 and 52. However, the pair of strips 59 are placed adjacent the pair of strips 55 in opposed relationship between sheets 50 and 51 so as to form a continuous stratum of weld-inhibiting material 60 between the interior surface of all the strips employed in forming pairs 55 and 59, and 58 and 61, and intermediate bands free of weld-inhibiting material. The superposed assembly of strips and sheets forms a stepped portion or ledge 63 and 64 formed by the lateral edges of sheet 50 and pair of strips 59 and the projecting surface of sheet 51 and between the lateral edges of sheet 52 and pair of strips 56 and the corresponding projecting surface of sheet 51, respectively. Fillers or spacers 65 and 66 are provided in each of the stepped portions 63 and 64, respectively, with weld-inhibiting material appropriately applied, as by coating, between the adjacent surfaces of filler 65 and 66 and the adjacent surfaces of sheets and inserts.

Upon assembly the weld-inhibiting material 5 applied in the specific manner to a strip such as 1 of FIGURE 2 provides bands of separation of weld-inhibiting material between the adjacent surfaces of the strips and sheets indicated by the appropriately shaded areas 67 leaving bands free of weld-inhibiting material indicated by the unshaded portions 68 between the adjacent surfaces of the strips and sheets.

The resultant pressure welded structure 69 ready for expansion contains a series of laminations 70 extending throughout its longitudinal length containing at opposite diagonal lateral corners a reduced and elongated spacer bar 71 and 72 formed from spacer bars or inserts 65 and 66, respectively, which are removed at this point. These laminations define a plurality of plaited portions 105 between and including portions of component sheets 50 and 51, and 51 and 52. The spacer bar 65 and 66 does not pressure weld to any portion of the structural panel due to coating of the weld-inhibiting material between their adjacent surfaces. As with the embodiments described above, a nozzle is suitably inserted within the pressure-welded unit 69 and the panel expanded by injection of a fluid pressure betweens the laminations 70. If corrugations are desired between the outer walls 73 and 74, the welded unit 69 may be expanded freely, or if flat outer walls are desired, the panel may be expanded between rigid flat platens.

Upon expansion a plurality of internal cross-sectional portions of pressure welded unit 69, unfolded from plaited portions 105, are bent out of the plane which is parallel relative to the outer surfaces of welded unit 69 into vertical interconnecting cross-members or reinforcing ribs 75 of a structural panel 76. As with the preceding embodiments, it will be noted that as portions of pressure-welded unit 69 are rotated into the member 75, no drawing, elongation or thinning of these portions takes place while the internal fluid pressure fully stretches the members or ribs 75 into a vertical position. Although only two layers of tubular sections are obtained by this embodiment, it is to be understood that this specific configuration was selected because of its relative simplicity in illustrating the type of multi-layer structure that may be obtained in accordance with this invention. As will be obvious any multiplicity of layers of tubular sections may be obtained by simply providing any number of sheets, such as 50, 51 and 52, with the appropriate number of strips interposed between them in accordance with this invention.

Figure 14:
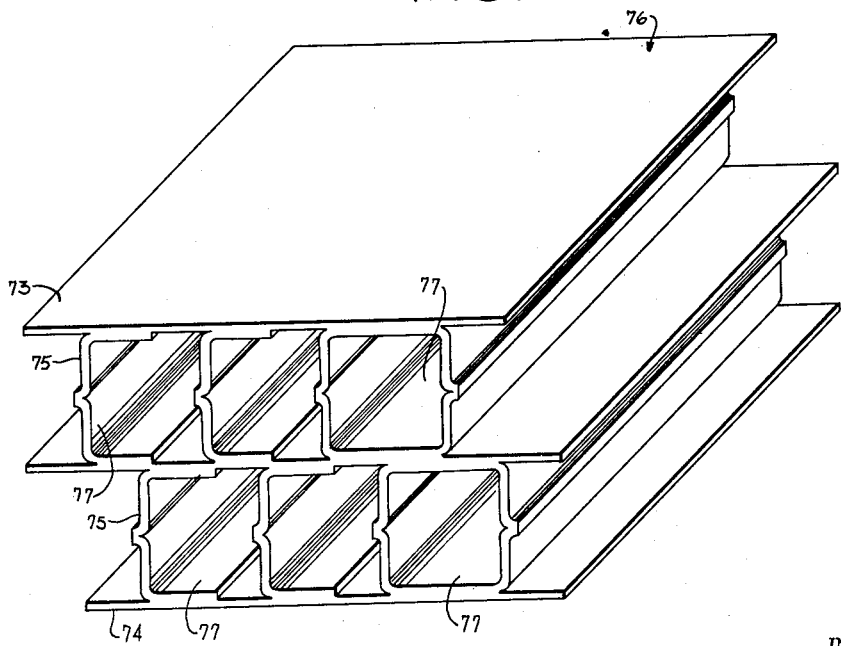

A plurality of these panels, as illustrated in FIGURE 14, may be appropriately connected together for use in building walls, roofs, floors, etc. It can be also used as a heating or cooling panel with some or all of the inner passages or compartments 77 filled with insulating materials, such as rock wool, thermo-setting plastic and like material.

Figure 15:
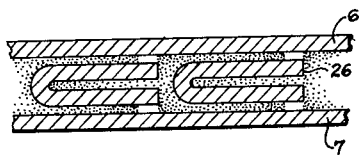
Figure 16:
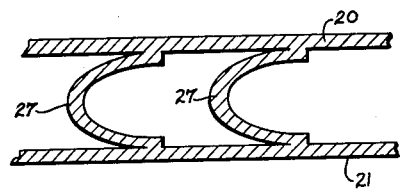

FIGURE 15 illustrates another embodiment of this invention employing a plurality of inserts 26 provided by folding over a wide strip along an axis through the center of the strip and parallel to the lateral edges thereof. For example, when a strip 1½ inches wide is folded over as described above, it results in an insert of ¾ inch wide. Before folding over the strip, as will be understood, the intended inner-surfaces of each insert are coated with a weld-inhibiting material. After being folded the exterior surfaces of the strip, including the bent edges, have applied to them a coating of weld-inhibiting material in a pattern providing a band free of weld-inhibiting material on both top and bottom exterior surfaces parallel and adjacent the free lateral edges of the folded strip or insert 26. The insert is then interposed between superposed sheets 6 and 7 pressure-welded together and expanded in the manner described above. A partially expanded panel is illustrated in FIGURE 16 showing ribs 27 being unfolded, out of parallel with the outer walls 20 and 21 from the plaited portion formed in accordance with this invention.

Figure 17:
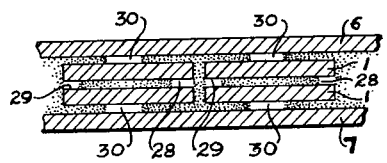
Figure 18:
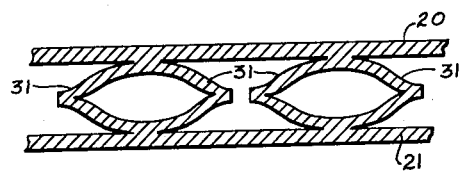

An additional embodiment is illustrated in FIGURE 17 in which the bands free of weld-inhibiting material between the bands are provided at 28 and 29 between strips 1, and at 30 between strips 1 and sheets 6 and 7. A partially inflated panel fabricated in this embodiment is shown in FIGURE 18 illustrating partially developed ribs 31, between outer walls 20 and 21, from the plaited portions of this embodiment.

Figure 19:
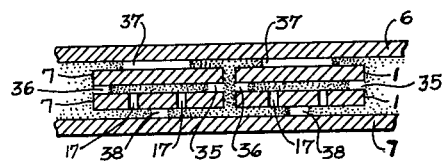
Figure 20:
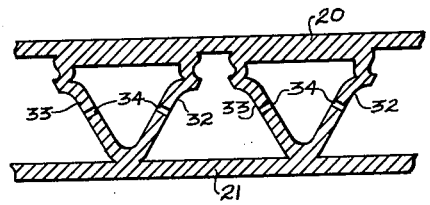

FIGURE 19 illustrates a modification of the embodiment of FIGURE 17 employing the use of orifices 17 through each of inserts 1. This modification includes the application of a specific pattern of weld-inhibiting material so as to result in the unfolding of the members or ribs 32 and 33, between outer walls 20 and 21, into a triangular configuration of FIGURE 20 provided with openings 34 intercommunicating with all the compartments between the ribs. The triangular configuration provides specific advantages in that the resultant structural panel will resist more lateral deflection when subjected to a force load. To obtain this modification or embodiment, the bands free of weld-inhibiting material are provided at 35 and 36 between inserts 1. However, to obtain the plaits, in this embodiment, between the surfaces of sheet 6 and adjacent strip 1, the band free of any weld-inhibiting material at 37 is much wider than the band provided at 38 between the surfaces of sheet 7 and its adjacent strip 1.

Figure 21:
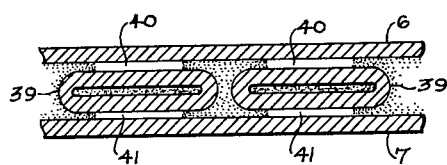
Figure 22:
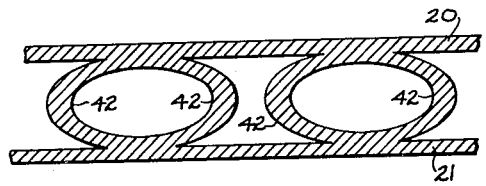

FIGURE 21 illustrates still another modification of this invention utilizing for the insert strips between sheets 6 and 7 a plurality of flattened tubes 39. As will be understood, prior to flattening the tubes, the interior walls thereof have applied to them an appropriate coating of weld-inhibiting material to prevent the pressure-welding of their surfaces together. The exterior surfaces of flattened tubes 39 are then coated with a suitable weld-inhibiting material to provide bands free of weld-inhibiting material at 40 and 41 between the exterior surfaces of flattened tubes 39 and the adjacent surfaces of sheets 6 and 7. Upon subsequent distention of the pressure-welded unit, the unwelded surfaces of flattened tubes 39 form plaited portions which unfold into interconnecting members or legs 42, between walls 20 and 21, free of any projecting flanges as in the preceding embodiments.

Figure 23:
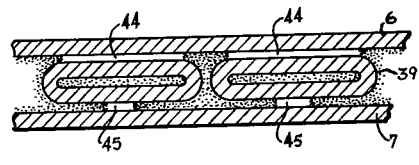
Figure 24:
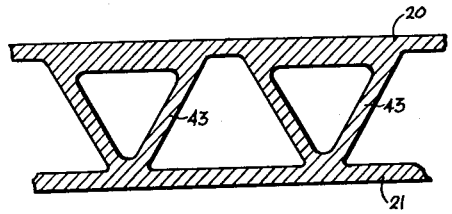

FIGURE 23 illustrates a still further embodiment of this invention to provide a triangular configuration of ribs or members 43 formed from flattened tubes such as 39 employed in FIGURE 21. However, to obtain this modification, a wider band free of weld-inhibiting material is provided at 44 between an exterior surface of flattened tube 39 and the adjacent surface of sheet 6 than the band provided at 45 between the adjacent surfaces of sheets 7 and flattened tube 39. It is to be understood, that although throughout the preceding embodiments the coating of weld-inhibiting material was applied to the inserts for convenience, the weld-inhibiting material may be applied to both the inserts and the surface of sheets 6 and 7 if desired. However, if the coating of weld-inhibiting material is applied to both the inserts and sheets 6 and 7, it will require an additional factor of proper mating between the various components in assembling them together.

Figure 25:
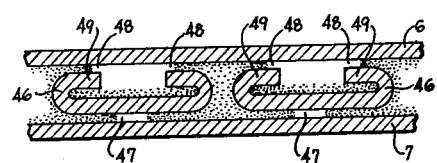

FIGURE 25 illustrates a still further embodiment of this invention in which inserts 46 between sheets 6 and 7 are formed by coating one surface of a plurality of strips and then bending over both lateral edges along two axes parallel to the lateral edges until both edges overlap a portion of the surface coated with weld-inhibiting material. Before being interposed between sheets 6 and 7, inserts 46 have the opposite faces of the strip coated with a weld-inhibiting material so as to provide bands free of weld-inhibiting material at 47 between the adjacent surfaces of sheets 7 and insert 46 and bands 48 between sheets 6 and the adjacent surface of the folded over portion 49 of insert 46. As seen in FIGURE 25, the band free of weld-inhibiting material 48 is applied parallel and adjacent the free edges of folded over portion 49. Also if desired the spaces between the free edges of the folded strip may be filled with weld-inhibiting material. It will be understood that although the free edges of folded over portion 49 are shown as being spaced at a substantial distance from each other, the strip may be folded over so that the spacing between these free edges may be any distance desired.

Figure 26:
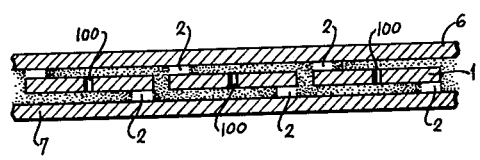
Figure 27:
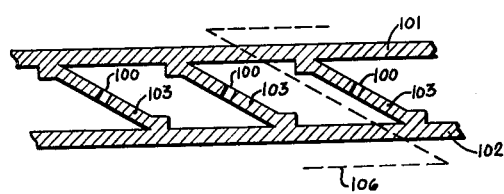
Figure 28:
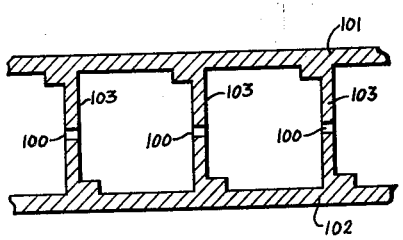

FIGURES 26 through 28 illustrate a still further embodiment of this invention utilizing single insert strips 1 between superposed sheets 6 and 7 which in the embodiment shown in FIGURE 26 forms a 3-ply assembly of components with bands free of weld-inhibiting material indicated at 2 at which points pressure-welding between the inserts and superposed sheets occurs in this embodiment, to form a plurality of plaited portions, according to the method detailed with more particularity above. The broken line 106 indicates the relative portion of outer walls 101 and 102, and members or ribs 103 forming part of the plaited portion resulting upon pressure-welding of the assembly of FIGURE 26. A plurality of orifices 100 are provided in each of strips 1 in order to provide an intercommunication means between the compartments ultimately forced from the strips. However, in this embodiment, since pressure-welding occurs at points adjacent diagonally opposed lateral edges of strip 1, this in effect forms hinges or pivot points, in subsequent expansion, for relative rotation between the components. Accordingly, upon expansion, consideration must be given to such relative rotation between the components in expanding between flat platens, for obtaining flat outer surfaces.

Figure 29:
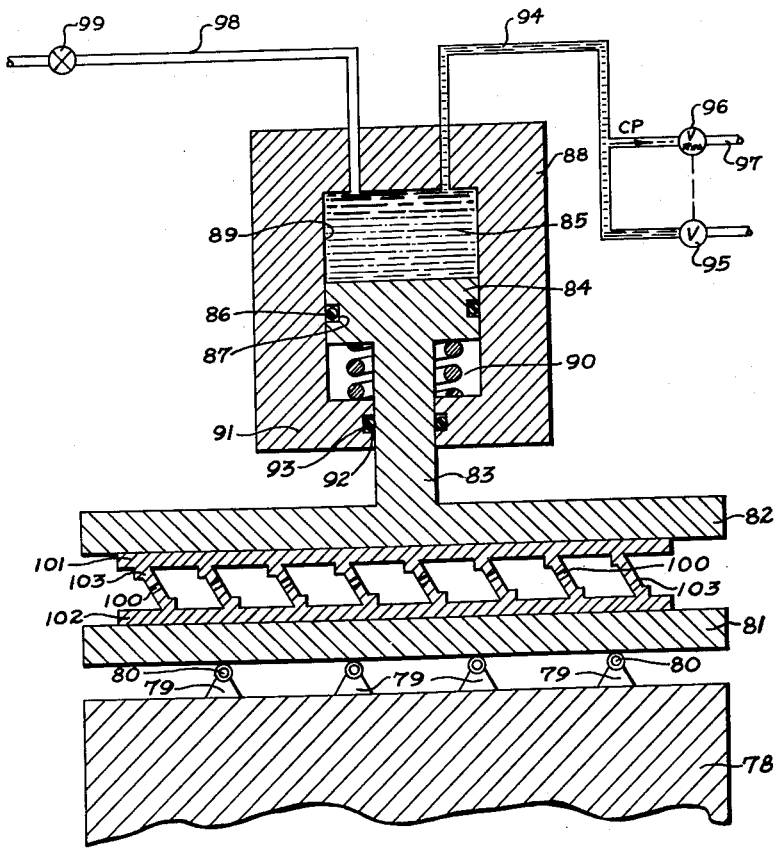
FIGURE 29 is a partially sectional view in elevation illustrating one embodiment of an aspect of this invention for expanding the panels of this invention with particular reference to the embodiments of FIGURES 27 and 28.

A suitable apparatus for expanding the pressure-welded unit formed from the assembled components of FIGURE 26 is depicted in FIGURE 29 which includes a permanently fixed base 78 provided with upwardly extending supports 79 on which are mounted a plurality of rollers 80. A flat platen 81 is provided for horizontal movement on rollers 80 and is secured by suitable guide means, not shown, against vertical movement by means well known in the art. A yielding flat platen 82 is provided in vertically cooperating relationship with platen 81 and has extending from its upper surface an integral piston rod 83 provided at its upper end with a piston 84. Piston 84 is received in a bore or piston chamber 85 of cylinder 88 in fluid tight relationship by means of an O-ring 86 mounted in groove 87 in piston 84 for sealing relationship with the vertical walls 89 of bore or piston chamber 85. Cylinder 88 is fixed with respect to base 78 in any appropriate manner, not shown.

A suitable resilient means, such as a spring 90 engages a shoulder 91 formed by a radially extending portion at the lower end of cylinder 88, and a shoulder formed between piston 84 and piston rod 83. The shoulder portion 91 is maintained in sealing relationship with piston rod 83 by means of O-ring 92 mounted in a groove 93. Spring 90 urges platen 82 upwardly so as to maintain it in a raised position.

A fluid conduit 94 in communicating relationship with bore or piston chamber 85, in piston 88, is connected through a valve 95 to a source of hydraulic pressure, not shown. A constant fluid pressure is maintained in bore or piston chamber 85, of cylinder 88, by means of a constant pressure inlet valve regulator 96 placed in the fluid network by means of a conduit 97. Pressure regulator 96 is operatively connected to valve 95 so as to close valve 95 when a desired pressure level is reached within bore or piston chamber 85 in cylinder 88. Venting for the fluid pressures within cylinder 88 is provided by means of a conduit 98 in communicating relationship with piston chamber 85 and the atmosphere through means of valve 99. As will be understood, conduit 98 can also by appropriate conduiting return the hydraulic fluid from piston chamber 85 back to the source of fluid pressure referred to above.

Prior to operation, valve 95 will be closed and valve 99 open whereby spring 90 will position platen 82 in the raised position. In operation valve 99 will be closed and the pressure-welded unit fabricated from the assembled components of FIGURE 26 placed on flat platen 81 below 82. Valve 95 is then opened to inject a fluid pressure into piston chamber 85 so as to lower flat platen 82 by depressing spring 90 until a desired pressure level is reached, as for example 500 pounds differential pressure between the opposed forces, acting on piston 84, fluid pressure and spring 90. When the desired pressure level is reached regulator 96 closes valve 95.

As will be understood a fluid pressure injecting nozzle, not shown, has been previously suitably inserted by means referred to above, in communicating relationship with the laminations formed between the adjacent surfaces separated by weld-inhibiting material. Upon injection of fluid pressure, the outer walls 101 and 102 of the pressure-welded unit separate against the yielding platen 82 with a rotary movement of the components relative to each other, upon unfolding of the plaited portion as indicated at broken line 106. However, since platen 81 is mounted on the rollers 80, it accommodates the rotary movement by moving in the horizontal direction while maintaining contact with outer walls while restraining outer wall 102 parallel with the outer wall 101. As the outer walls 101 and 102 separate away from each other against yielding platen 82, the internal pressure of the panel is reflected within piston chamber 85. However, since a constant pressure within the piston chamber is desired to be maintained by means of regulator 96, this regulator maintains a constant pressure by exhausting the excessive pressure, reflected from the internal pressures within the expanding panel, through conduit 97. It is to be understood that although this specific apparatus is provided with horizontal movement in one of the platens employed, provision for the relative rotation between the components may be provided by other means. For example, a movable structure, similar to platen 81 provided with rollers acting on base 78 or platen 82 may be interposed between the welded unit and one of the platens so that one or both of the outer surfaces of the welded unit is adapted to move in a horizontal direction relative to each other or other components. Upon separation of outer walls 101 and 102 away from each other, the unwelded portions of strip 1 forming part of the plaits, rotate into a vertical position as cross-members or legs 103. A partially expanded structural panel with the legs 103 in a partially unfolded position are illustrated in FIGURE 27. A fully expanded structural panel with the cross-members or legs further unfolded and developed in a fully stretched position, without any substantial drawing, elongation or thinning of these cross-sections is illustrated in FIGURE 29.

Although the invention has been described with reference to specific embodiments, materials and details, various modifications and changes, within the scope of this invention, will be apparent to one skilled in the art and are contemplated to be embraced within the invention.

What is claimed is:

1. In a method of making hollow articles whose walls are spaced by a plurality of integral reinforcing rib portions by pressure welding a plurality of metal strips partially coated with a weld-inhibiting material to superposed sheets of metal, the steps which comprise coating with said material the surfaces of said strips with a pattern designed to form said rib portions, assembling said strips in at least two rows between said superposed sheets of metal, said pattern providing between adjacent surfaces in each row of said strips and sheets longitudinal bands of said material and longitudinal bands free of said material with all said bands being disposed in an arrangement adapted to form plaited sections from each corresponding row of said strips upon subsequent welding together of said strips and said sheets, pressure-welding said strips and sheets in their adjacent areas not separated by said material, and expanding the welded assembly without substantial elongation or thinning of the metal in said rib portions.

2. In a method of making hollow articles whose walls are spaced by integral reinforcing rib portions by pressure-welding a plurality of stacked metal components coated with a weld-inhibiting material, the steps which comprise coating with said material portions of the surfaces of metal strips with a pattern designed to form said rib portions, assembling a plurality of said strips in at least two rows between superposed sheets of metal, said pattern providing between adjacent surfaces in each row of said strips and sheets longitudinal bands of said material and by bands free of said material with all said bands being disposed in an arrangement adapted to form plaited sections from each corresponding row some sheet strips upon subsequent welding together of said strips and said sheets, pressure-welding together said strips and sheets in their adjacent areas not separated by said material, and thereafter expanding the pressure welded assembly without substantial elongation or thinning of the metal in said rib portions.

3. In a method of making hollow articles whose walls are separated by integral reinforcing rib portions by pressure-welding a plurality of metal components coated with a weld-inhibiting material, the steps which comprise coating with said material portions of the surfaces of metal strips with a pattern designed to form said rib portions, assembling said strips in at least two rows between superposed sheets of metal, said pattern providing between all adjacent surfaces in each row of said strips and sheets laterally spaced bands of said material parallel to said strips and parallel bands free of said material with all said bands being disposed in an arrangement adapted to form plaited sections from each corresponding row some sheet strips upon subsequent welding together of said strips and said sheets, pressure-welding said strips and said sheets in their adjacent areas not separated by said material, and thereafter expanding the welded assembly without substantial elongation or thinning of the metal in said rib portions.

4. A method of making a metal hollow article having opposed walls spaced by integral reinforcing ribs disposed transverse to and forming integral extensions of said walls comprising applying a coating of weld-inhibiting material to a plurality of rectangular metal strips, assembling said strips in at least two rows disposed in parallel relationship to each other between metal sheets, said coating being applied to provide between each pair of opposed adjacent surfaces in each row of said assembly a band of area devoid of said material with said band disposed in parallel relationship with the lateral edges of said strips in a pattern defining in the cross-section of said assembly an unjoined plaited section of metal formed of portions of said strips and said sheets not separated by said material, welding said strips and sheets together in their adjacent areas not separated by said material whereby said welded strips form a unified plaited section of metal welded to said sheets and corresponding to said unjoined plaited section, and thereafter spacing said sheets apart to unfold said unified plaited section into a rib between said sheets.

5. The method of claim 4 wherein a plurality of said rows of said strips are disposed in parallel relationship with each other between said sheets.

6. The method of claim 5 wherein said strips comprise a length of flat stock of metal folded over upon itself upon a center line intermediate the lateral edges thereof with the adjacent interior surfaces of said folded strip separated by weld-inhibiting material.

7. The method of claim 5 wherein said strips comprise at least one flattened tube having its inner adjacent surfaces separated by weld-inhibiting material.

References Cited in the file of this patent

UNITED STATES PATENTS

| | | |
|---|---|---|
| 2,212,481 | Sendzimir | Aug. 20, 1940 |
| 2,333,343 | Sendzimir | Nov. 2, 1943 |
| 2,498,275 | Johnson | Feb. 21, 1950 |
| 2,743,667 | White | May 1, 1956 |
| 2,759,246 | Campbell | Aug. 21, 1956 |
| 2,766,514 | Adams | Oct. 16, 1956 |
| 2,828,533 | Fromson | Apr. 1, 1958 |
| 2,851,770 | Fromson | Sept. 16, 1958 |
| 2,857,659 | Staples | Oct. 28, 1958 |
| 2,922,344 | Meissner | Jan. 26, 1960 |
| 2,957,230 | Johnson | Oct. 25, 1960 |

FOREIGN PATENTS

| | | |
|---|---|---|
| 220,857 | Australia | Apr. 17, 1958 |